United States Patent [19]
Thompson et al.

[11] 3,723,566
[45] Mar. 27, 1973

[54] ORGANOSILOXANE POLYAMIDE BLOCK COPOLYMERS

[75] Inventors: John Thompson, Barry, Glamorgan; Michael James Owen, Penarth, Glamorgan, both of Wales

[73] Assignee: Midland Silicones Limited, Reading, Berkshire, England

[22] Filed: Apr. 29, 1971

[21] Appl. No.: 138,800

[30] Foreign Application Priority Data

May 4, 1970 United Kingdom............21,379/70

[52] U.S. Cl..............260/824, 117/124 F, 161/190, 161/197, 260/46.5 E, 260/239.3
[51] Int. Cl..........................C08g 47/10, C08g 41/04
[58] Field of Search....................................260/824 R

[56] References Cited

UNITED STATES PATENTS

| | | | |
|---|---|---|---|
| 3,562,353 | 2/1971 | Chow et al. | 260/824 |
| 3,487,122 | 12/1969 | Stengle | 260/824 |
| 3,457,323 | 7/1969 | Stengle | 260/824 |
| 3,341,501 | 9/1967 | Hedrick et al. | 260/824 |
| 3,284,156 | 11/1966 | Magat et al. | 260/824 |

FOREIGN PATENTS OR APPLICATIONS

| | | | |
|---|---|---|---|
| 1,037,125 | 8/1958 | Germany | 260/824 |
| 1,915,789 | 10/1969 | Germany | 260/824 |

Primary Examiner—Samuel H. Blech
Attorney—Robert F. Fleming, Jr., Laurence R. Hobey, Harry D. Dingman and Howard W. Hermann

[57] ABSTRACT

Organosiloxane-polyamide block copolymers useful as additives to nylon products providing durable low energy surfaces exhibiting low coefficient of friction and as modified nylon exhibiting excellent bonding to glass are defined as block copolymers containing at least one polyamide block of two or more units of the general formula

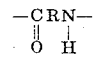

where R is an alkylene radical of two to 15 carbon atoms and an organosiloxane block containing two or more units of the general formula $R'_a SiO_{(4-a/2)}$ where $a$ is 1, 2 or 3, and R' is a hydrocarbyl or halogenohydrocarbyl of one to 18 carbon atoms or a divalent organic radical, at least one R' being a divalent organic radical linking the siloxane block to the polyamide block.

7 Claims, No Drawings

ORGANOSILOXANE POLYAMIDE BLOCK COPOLYMERS

This invention relates to novel organosiloxane-polyamide block copolymers and to a method for the preparation of such copolymers.

According to the invention, there is provided an organosiloxane-polyamide block copolymer consisting essentially of (1) at least one polyamide block containing at least two units of the general formula

wherein R represents an alkylene radical having from two to 15 carbon atoms, and (2) an organo-siloxane block comprising at least two units of the general formula $R'_a SiO_{(4-a)/2}$ wherein $a$ has a value of 1, 2, or 3, and R' represents a monovalent hydrocarbon radical, a monovalent halogenated hydrocarbon radical or a divalent organic radical attached to silicon through a silicon to carbon bond, there being present in the organosiloxane block at least one of the divalent organic radicals linking the polyamide block and the organosiloxane block.

The block copolymers of this invention contain one or more polyamide blocks attached to an organosiloxane block through a divalent organic radical. The copolymers can be of several different configurations depending on the number of polyamide blocks attached to the organosiloxane block. In their simplest form, the copolymers can have the configuration AB in which A represents the polyamide block and B the organosiloxane block or they can be of the type represented by ABA. When more than two polyamide blocks are attached to the organosiloxane block, the copolymers can be represented by $B(A)_n$, n being an integer greater than 2.

In the polyamide blocks, the radical R can be any alkylene radical having from two to 15 carbon atoms. Such blocks are derived by well-known methods from the polymerization of a lactam or copolymerization of two or more lactams, and the preferred copolymers are those in which the polyamide blocks are derived from the commercially known lactams, e.g. epsilon-caprolactam, lauryl lactam or mixtures thereof. Preferably, therefore, R is an alkylene radical having five or 11 carbon atoms.

In the siloxane block, each R' represents the specified divalent organic radical or a monovalent hydrocarbon or halogenated hydrocarbon radical containing one to 18 carbon atoms, for example, an alkyl radical, e.g. the methyl, ethyl, propyl, butyl, nonyl, tetradecyl and octadecyl radical, an alkenyl radical, e.g. the vinyl, allyl and methallyl radical, an aryl radical, e.g. phenyl, naphthyl, benzyl and tolyl or a halogenated derivative of the foregoing hydrocarbon radicals such as a haloalkyl radical, e.g. chloromethyl and trifluoropropyl and bromophenyl. At least one R' radical in the organosiloxane block is a divalent organic radical which serves to link the polyamide segment and the organosiloxane segment. One of the free valencies of the divalent radical is satisfied by a silicon atom of the organo-siloxane block and the other by a nitrogen atom of the polyamide block. For most applications, the preferred copolymers are those in which at least one of the R' radicals is a divalent organic radical and the remainder are methyl radicals. It is also preferred that the organosiloxane blocks comprise units in which $a$ is 2.

The nature of the linking radical represented by R' is not critical and will depend on the method employed to prepare the copolymer. It will, however, be understood by those skilled in the art that the nature of the radical should be consistent with the intended application of the block copolymer. For example, the radical should not contain any hydrolytically unstable linkages when the intended application requires hydrolytic stability in the copolymer. Preferably, the divalent organic radicals represented by R' can be represented by the formula

in which X is a divalent organic radical attached to silicon through a silicon-carbon linkage, for example, a saturated or unsaturated divalent hydrocarbon radical, a divalent radical composed of carbon, hydrogen and oxygen in which the oxygen is present in the form of ether groups, or a divalent hydrocarbon radical containing amino groups or sulphur atoms. Preferably X is a divalent hydrocarbon radical or amino-substituted hydrocarbon radical having from three to 11 carbon atoms. Examples of R' radicals, therefore, include

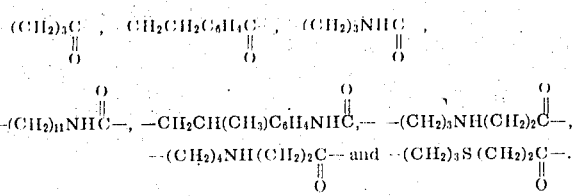

The block copolymers of this invention can be prepared by a novel process which involves promoting or initiating the anionic polymerization of a lactam employing an organosiloxane having at least one substituent containing a N-acyl lactam group or a functional group which is effective in initiating the polymerization of the lactam.

Included within the scope of this invention, therefore, is a process for the preparation of an organosiloxane-polyamide block copolymer comprising (A) mixing (1) at least one lactam of the general formula

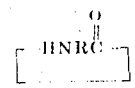

wherein R represents an alkylene radical having from two to 15 carbon atoms (2) at least one organo-siloxane having at least two units of the general formula $R'''_a SiO_{(4-a)/2}$ wherein $a$ has a value of 1, 2 or 3 and R''' represents a monovalent hydrocarbon radical, a monovalent halogenated hydrocarbon radical or a radical $-X'Y$ wherein X' represents a divalent hydrocarbon radical, a divalent radical composed of carbon, hydrogen and oxygen in which the oxygen is present in the form of ether groups or a divalent hydrocarbon radical substituted with amino groups or sulphur atoms, and Y is a radical of the formula

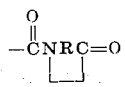

wherein R represents an alkylene radical having from two to 15 carbon atoms, or Y is a functional group capable of initiating or promoting polymerization of the lactam (1) there being at least one —X'Y radical present in the organo-siloxane, and (3) a catalyst for the anionic polymerization of the lactam, and (B) heating the mixture to a temperature at which polymerization of the lactam occurs.

Examples of the lactams which can be employed to prepare block copolymers according to the process of this invention are propiolactam, pyrrolidone, enantholactam, capryllactam, azacycloundecan-2-one, lauryl lactam, the preferred lactams being epsilon-caprolactam, lauryl lactam or mixtures thereof.

The organosiloxanes employed in the process of this invention are those having at least two units of the general formula $R'''_aSiO_{(4-a)/2}$ wherein $a$ has a value of 1, 2 or 3 and R''' is a monovalent hydrocarbon radical or monovalent halogenated hydrocarbon radical as defined and exemplified in respect of R', or is the radical —X'Y wherein X' and Y are as hereinbefore defined. At least one R''' radical in the siloxane should be the —X'Y radical and preferably the remaining R''' radicals are predominantly methyl radicals. In the —X'Y radical, X' represents a divalent hydrocarbon radical, a divalent hydrocarbon radical having oxygen therein in the form of ether, that is, —COC— linkages or a divalent hydrocarbon radical substituted with amino groups or sulphur atoms. Examples of X' radicals, therefore, are —(CH$_2$)$_3$—,

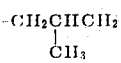

—(CH$_2$)$_6$—, —(CH$_2$)$_3$NH(CH$_2$)$_2$—, —(CH$_2$)$_3$S(CH$_2$)$_2$—, —CH$_2$CH$_2$CH$_2$OCH$_2$CH$_2$— and —C$_6$H$_4$CH$_2$CH$_2$—. Preferably X' is a divalent hydrocarbon radical or a divalent radical composed of carbon, hydrogen and oxygen in which the oxygen is present in the form of ether linkages. Most preferably, X' represents the —(CH$_2$)$_3$— or —CH$_2$CH(CH$_3$)— radical. The radical Y is the radical

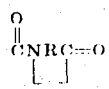

in which R represents a divalent alkylene radical having from two to 15 carbon atoms or Y represents a functional radical capable of initiating or promoting the polymerization of the lactam (1). A variety of radicals are known which function to initiate or promote the polymerization of lactams and Y can represent any of these. Examples of such radicals include ester, amide, anhydride and halogen-substituted carboxylic acid groups, e.g.

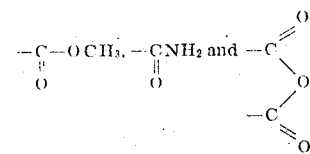

groups, isocyanate groups and groups containing nitrogen directly substituted with —SCO or —SC$_6$H$_5$, also urea and thiourea derivatives.

The organosiloxanes can vary from the disiloxane up to the high molecular weight polysiloxanes depending on the size of copolymer molecule desired or on the relative weights of siloxane and polyamide segments in the copolymer. Methods of making the organopolysiloxane reactants are generally well known in the art and are described for example in British Patent Nos. 769,496, 788,984 and 1,084,855. Organopolysiloxanes having substituted therein the N-acyl lactam group are prepared by reacting an organosilicon compound containing an SiH group with an N-aliphatically unsaturated acyl lactam. This reaction is carried forward in the presence of a platinum-type catalyst. The N-aliphatically unsaturated acyl lactam can be prepared by reaction of an acyl chloride such as vinyl acetyl chloride with a lactam such as epsilon-caprolactam.

According to the process of this invention, the organosiloxane functions to initiate the polymerization of the lactam or it forms a nucleus from which one or more polymerized lactam segments can grow. In the performance of the process, the lactam and the organosiloxane are mixed and anionic polymerization of the lactam is initiated, there being included in the reaction mixture a suitable polymerization catalyst (3). Such catalysts are well known in the art and include, for example, alkali and alkaline earth metals and the hydrides, hydroxides and carbonates of such metals with the metals and their hydrides being preferred. Polymerization of the lactam can be carried out in bulk or in organic solvent solution and at temperatures from above about 80°C. to more than 240°C. In general, the only limiting factors with regard to the operative temperatures are the melting point of the lactam, the desired polymerization rate and the thermal stability of the components of the reaction mixture. Most conveniently, the reaction is carried out at a temperature within the range from 110° to 170°C.

When polymerization is to be carried out in the absence of a solvent, the lactam and the organosiloxane are preferably mixed at a temperature at which the lactam is molten, and the catalyst then added. If desired, however, the lactam, organosiloxane and catalyst can be brought together at room temperature and heated, preferably with stirring to a temperature at which polymerization of the lactam takes place. When the reaction is carried out in an organic solvent, the preferred solvents are the high boiling hydrocarbons, e.g. deca-hydronaphthalene or amides free of active hydrogen atoms, e.g. NN'-dimethylacetamide.

The degree of polymerization which the polyamide attains can be controlled by the proportion of anionic polymerization catalyst, siloxane initiator and lactam employed. This enables block copolymers to be prepared with any desired molecular weight for the polyamide segments. The configuration of the block copolymer will depend on the number and disposition of the —X'Y radicals in the organosiloxane reactant.

The block copolymers of this invention find application as additives for incorporation in polyamides to modify the processing and other properties thereof. Thus, the ABA copolymers of this invention when incorporated into nylon, preferably in amounts of from 0.1 to 5 percent by weight, provide the nylon polymer with a durable low energy surface having a low coefficient of friction. Copolymers of the BAB type having suitable reactive terminal groups in the organosiloxane segment can be used to improve the bonding of nylon surfaces to glass. For such applications, the preferred block copolymers are those in which the organosiloxane blocks have a molecular weight of from 150 to 15,000 and are composed predominantly of dimethylsiloxane units.

The following examples illustrate the invention, and Me represents the $CH_3$ radical.

EXAMPLE 1

Dried epsilon-caprolactam (5.7 g., 0.05 mole) was melted under argon in a flask fitted with a gas dispersion head for mixing and the temperature raised to 120°C. To the molten caprolactam was then added 4.1 g. (0.001 mole) of an organosiloxane of the average formula

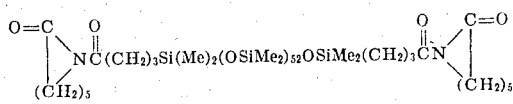

followed by sodium hydride (0.1 g., 0.002 mole) as a 50 percent by weight dispersion in mineral oil. Solidification of the melt occurred about 3 minutes after addition of the sodium hydride catalyst and polymerization was allowed to continue for 1 hour. The product was extracted with acetone to remove unreacted caprolactam or organosiloxane and the residue was a polyamide-organosiloxane polyamide block copolymer having the average structure:

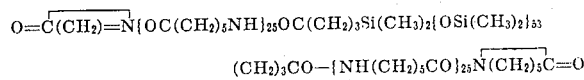

EXAMPLE 2

Epsilon-caprolactam (11.3 g., 0.1 mole) and lithium hydride (0.08 g., 0.01 mole) were stirred together under argon at 100°C. When the reaction has ceased, the reaction temperature was increased to 120°C. and an organosiloxane (11.3 g., 0.005 mole) of the average formula

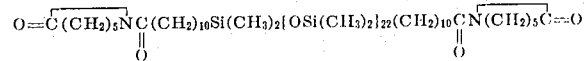

was thoroughly mixed into the molten caprolactam. The polymerization was allowed to continue for 1 hour and the product extracted with boiling benzene to remove unchanged starting material. The product was a block copolymer of the average formula

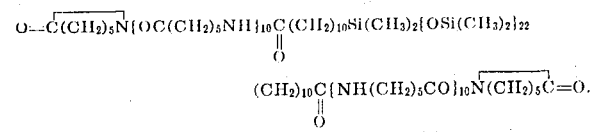

In this copolymer, the cyclic terminal groups can be opened by reaction with an amine.

EXAMPLE 3

Azacyclotridecan-2-one (lauryl lactam) (6.85 g., 0.035 mole) and an organosiloxane (2.93 g., 0.0015 mole) of the average formula

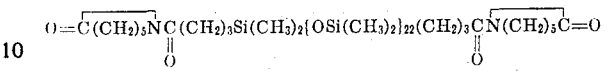

were mixed together under argon at 170°C. Sodium hydride as a 50 percent dispersion in a mineral oil (0.144 g., 0.003 mole) was then added and the polymerization was allowed to continue for 1 hour. The product was extracted with boiling benzene to remove unchanged starting material. The product was a block copolymer having the average formula

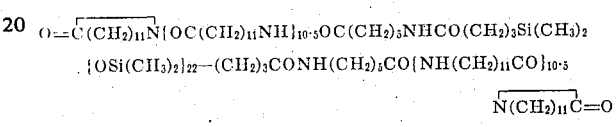

EXAMPLE 4

Epsilon-caprolactam (5.7 g., 0.05 mole) and organosiloxane employed in Example 1 (4.1 g., 0.001 mole) were stirred together under argon in decahydronaphthalene (20 ml.) at 120°C. Sodium hydride, as a 50 percent by weight dispersion in mineral oil (0.1 g., 0.002 mole) was added to the solution and the polymerization was allowed to continue for 2 hours, precipitation of the block copolymer commencing after approximately 30 minutes. The solid product was filtered from the cooled reaction mixture and was washed with hot benzene. The product was a block copolymer having the average formula

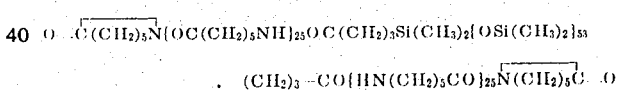

EXAMPLE 5

Epsilon-caprolactam (11.3 g., 0.1 mole) and an organosiloxane (3.73 g., 0.0033 mole) of the average formula $O=C=N(CH_2)_3Si(CH_3)_2[OSi(CH_3)_2]_{12}(CH_2)_3N=C=O$ were mixed together under argon at 120°C. The catalyst, which was the sodium salt of caprolactam (0.89 g., 0.0066 mole) was then added and the polymerization allowed to continue for 1 hour. The product was extracted with benzene to remove any unchanged starting material. The product was a block copolymer having the average formula

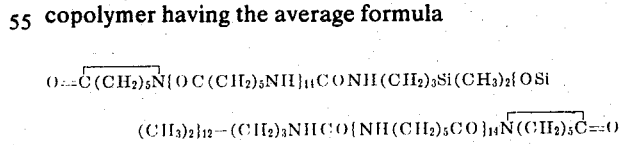

That which is claimed is:
1. A process for the preparation of an organosiloxane-polyamide block copolymer which comprises (A) mixing (1) at least one lactam of the general formula

wherein R represents an alkylene radical having from 2 to 15 carbon atoms, (2) at least one organosiloxane having at least two units of the general formula $R'''_a SiO_{(4-a)/2}$ wherein $a$ has a value of 1, 2 or 3 and $R'''$ represents a monovalent hydrocarbon radical or a monovalent halogenated hydrocarbon radical of 1 to 18 carbon atoms or a radical $-X'Y$ wherein $X'$ represents a divalent hydrocarbon radical, a divalent radical composed of carbon, hydrogen and oxygen in which the oxygen is present in the form of ether groups or a divalent hydrocarbon radical substituted with amino groups or sulphur atoms, and Y is a radical of the formula

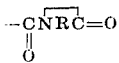

wherein R represents an alkylene radical having from two to 15 carbon atoms, or Y is a functional group capable of initiating or promoting polymerization of the lactam (1), there being at least one $-X'Y$ radical present in the organosiloxane, and (3) a catalyst for the anionic polymerization of the lactam and (B) exposing the mixture to a temperature at which polymerization of the lactam occurs.

2. A process as claimed in claim 1 wherein $X'$ represents a divalent hydrocarbon radical or a divalent radical composed of carbon, hydrogen and oxygen wherein the oxygen is present in the form of ether groups.

3. A process as claimed in claim 2 wherein $X'$ is the $-(CH_2)_3-$ or the $-CH_2CH(CH_3)-$ radical.

4. A process as claimed in claim 1 wherein the lactam is epsilon-caprolactam, lauryl lactam or a mixture thereof.

5. A process as claimed in claim 1 wherein the $R'''$ radicals are methyl radicals and the specified $-X'Y$ radicals.

6. A process as claimed in claim 1 wherein the polymerization catalyst (3) comprises an alkali or alkaline earth metal or a hydride thereof.

7. A process as claimed in claim 1 wherein the polymerization of the lactam is carried out at a temperature in the range from 110° to 170°C.

* * * * *